United States Patent
Heulitt

(10) Patent No.: US 6,615,774 B2
(45) Date of Patent: Sep. 9, 2003

(54) ADJUSTABLE PRESSURE ACTUATED FUEL/AIR DIAPHRAGM VALVE ASSEMBLY

(76) Inventor: Robert G. Heulitt, 20 Atlantic Ave., Long Branch, NJ (US) 07764

(*) Notice: Subject to any disclaimer, the term of this patent is extended or adjusted under 35 U.S.C. 154(b) by 0 days.

(21) Appl. No.: 09/970,111

(22) Filed: Oct. 3, 2001

(65) Prior Publication Data

US 2003/0066511 A1 Apr. 10, 2003

(51) Int. Cl.[7] .................................. F16K 15/02
(52) U.S. Cl. ................ 123/73 V; 123/65 V; 123/590; 137/524; 137/543.15
(58) Field of Search .................. 123/65 V, 73 V, 123/306, 590, 593; 137/524, 543.15

(56) References Cited

U.S. PATENT DOCUMENTS 3,462,994 A * 8/1969 Maust ............... 137/543.15 X
5,243,934 A * 9/1993 Boyesen ................ 123/73 V

FOREIGN PATENT DOCUMENTS

GB         1517090    * 7/1978    ......... F16K/15/14

* cited by examiner

Primary Examiner—Tony M. Argenbright
(74) Attorney, Agent, or Firm—Robert M. Skolnik

(57) ABSTRACT

A diaphragm valve assembly includes a diffusing screen, and a generally spherical lightweight membrane that provides a 360° circular seal. Spring loading enables variable resistance to be placed on the seal to allow the operator to adjust the internal pressures in an engine by metering the intake and exhaust cycles to obtain maximum performance characteristics from the subject engine.

16 Claims, 5 Drawing Sheets

ADJUSTABLE PRESSURE ACTUATED FUEL/AIR DIAPHRAGM VALVE ASSEMBLY

BACKGROUND OF THE INVENTION

1. Field of the Invention

The present invention relates to a fuel/air regulating device for controlling the incoming fuel/air in piston driven, reciprocating, internal combustion engines.

2. Description of the Related Art

As described in U.S. Pat. No. 5,243,934 and the patents discussed therein, reed valves are used in internal combustion engines to control air and or air/fuel intake. In two-stroke engines, reed valves have improved efficiency of the engine by improving transfer of the air and fuel from the crankcase to the combustion chamber while simultaneously sealing against back flow of the incoming fuel/air charge. Reed valves have also been employed in four stroke engines to control air intake and have improved engine performance.

As disclosed in the aforementioned patents, while reed valves have improved the performance of engines, such valves, themselves, introduce problems of operating life and wear. More specifically, multi-staged reeds have been subjected to greater stress on certain petals undergo material fatigue and breakage.

Prior art solutions to these problems included protective coatings, use of a cage to modify intake passages upstream from the reed, joining reed petals together, use of thicker and different reed valve materials and the use of wider reed valve ports and petals.

The present invention is a structure which eliminates the sources of the present state of the art reed valve design problems by replacing the petal style reed with a spring loaded diaphragm that will both regulate and improve the distribution and atomization of the fuel/air charge to the combustion chamber.

SUMMARY OF THE INVENTION

The present invention provides an intake valve, which is mounted in the intake manifold of internal combustion engines, between the output of the carburetor and the input of the combustion chamber.

A principal object and advantage of the invention is the provision of an intake manifold valve for internal combustion engines which provides a diffuser screen for improved atomization of the fuel/air mixture for a more complete combustion.

Another object and advantage of the invention is the provision of an intake manifold valve, which provides an increased plenum volume when compared prior art designs.

Still another object and advantage of the invention is the provision of an intake valve which is more durable than prior art designs.

Another object and advantage of the invention is the provision of an intake valve, which provides improved distribution of the incoming fuel/air charge.

A further object and advantage of the invention is the provision of an intake valve that provides an increase in velocity of the incoming fuel/air charge as it passes through the valve assembly.

Another object and advantage of the invention is the provision of an intake valve, which provides an increase in density of the incoming charge.

A further object of the invention is the provision of an intake valve, which recycles the unspent gases of the previous cycle back into the slipstream of the incoming charge.

A further object and advantage of the invention is the provision of an intake valve, which will improve engine deceleration. A further object of the present invention is the improved scavenging of the crankcase gases of two stroke engines.

A further object of the valve is to direct the incoming fuel/air.

A still further advantage of the present invention is the provision of both internal and external adjustable valve diaphragm-tensioning systems allowing torque curve adjustments.

The above objects are realized with the present invention when it is placed between the output of the engine's fuel/air supply and the plenum area before the combustion chamber.

The valve assembly is comprised of a diffuser screen positioned across an intake manifold that attaches to a lightweight hollow spherical body. The valve body's shape works in conjunction with an adjustable spring loaded, conically shaped diaphragm with a built in vortex generator. This is clearance fitted on a centrally located guide shaft that is secured by a retaining clip at the apex of the mounting plates' bracing. The valve diaphragm seals along its circumference where it contacts the converging inner wall of the valve body. The aft section of the assembled valve has a vectoring skirt and vent holes around its circumference.

The foregoing, as well as further objects and advantages of the invention will become apparent to those skilled in the art from a review of the following detailed description of my invention, reference being made to the accompanying drawings.

DETAILED DESCRIPTION OF THE PREFERRED EMBODIMENT

Figure 1:
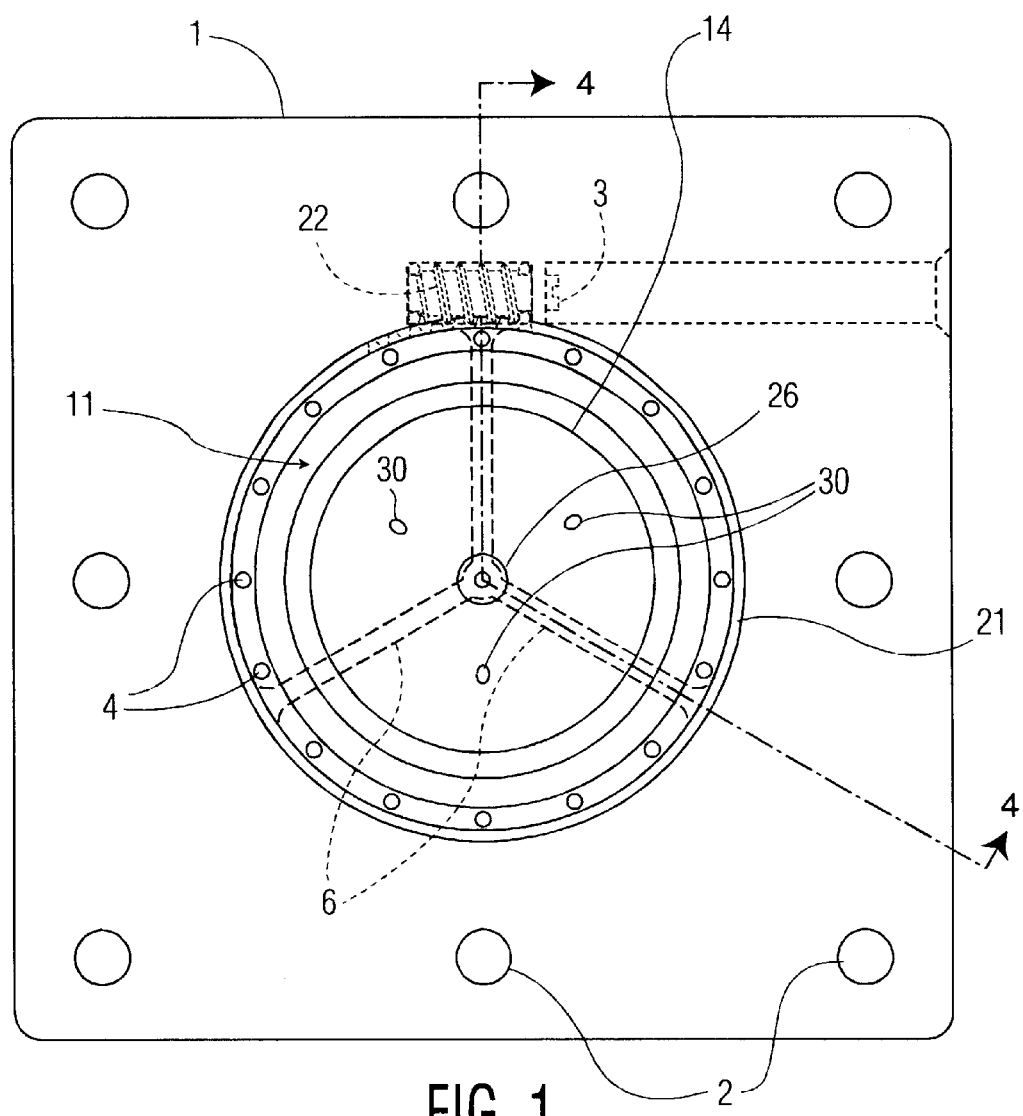
FIG. 1 is a rear view of the diaphragm valve.

In the drawings, the following table sets forth each reference numeral set forth in the drawings:

| | |
|---|---|
| 1 | mounting plate |
| 2 | mounting holes |
| 3 | slotted engagement |
| 4 | venturi |
| 5 | diffuser screen |
| 6 | guide shaft bracing |
| 7 | diffuser screen retaining screw and shaft alignment guide |
| 8 | tensioning adjustment notches |
| 9 | coil spring |
| 10 | valve diaphragm |
| 11 | valve body |
| 12 | guide shaft |
| 13 | vortex generator |
| 14 | vector skirt |
| 15 | valve seat |
| 16 | guide shaft retaining clip |
| 17 | o-ring |
| 18 | o-ring |
| 19 | adjuster access |

-continued

| 20 | plenum area |
| 21 | intake port |
| 22 | worm gear |
| 23 | engagement splines |
| 24 | threaded receiver |
| 25 | spring seat |
| 26 | guide shaft head |
| 27 | recess |
| 28 | low pressure vortex |
| 29 | diaphragm alignment guide |
| 30 | bleed-off holes |

FIG. 1 is a rear view of the regulating valve. The valve includes a mounting plate 1. The mounting plate has several holes 2 to enable it to be mounted in the path of the incoming fuel/air and the combustion chamber of the intended engine. The mounting plate 1 provides a fixed base for the guide shaft bracing 6. The mounting plate 1 also serves as a receiver for the valve body 11. The mounting plate also serves as a housing for the worm gear 22, a component of the external diaphragm tensioning system of FIG. 2. This view also gives a good illustration of the vent holes 4 located in the valve body's circumference.

The engine's intake port 21 is formed between inner walls of the intake of mounting plate 1 and the adjoining portions of valve body 11.

Figure 2:
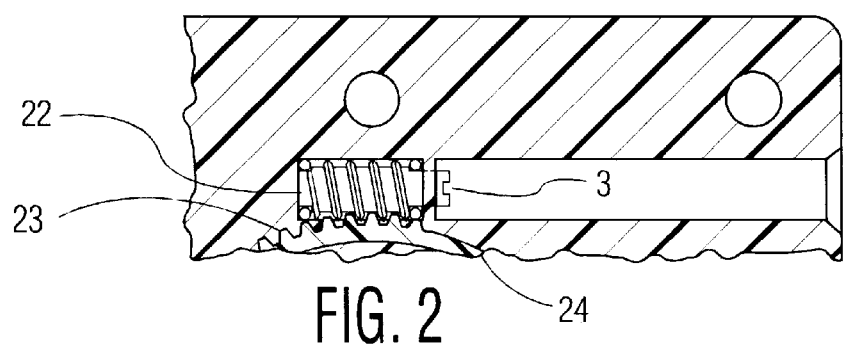
FIG. 2 is a cutaway rear view of the exterior diaphragm tensioning adjuster.

FIG. 2 displays the exterior diaphragm tension system. It includes a worm gear 22 with its slotted engagement 3 housed in the mounting plate 1. Numeral 23 denotes a portion of the worm gear's engagement splines. These splines allow the valve body 11 to be rotated from the exterior thereof, using its threaded portion 24, better shown in FIG. 4 to guide the movement.

Figure 3:
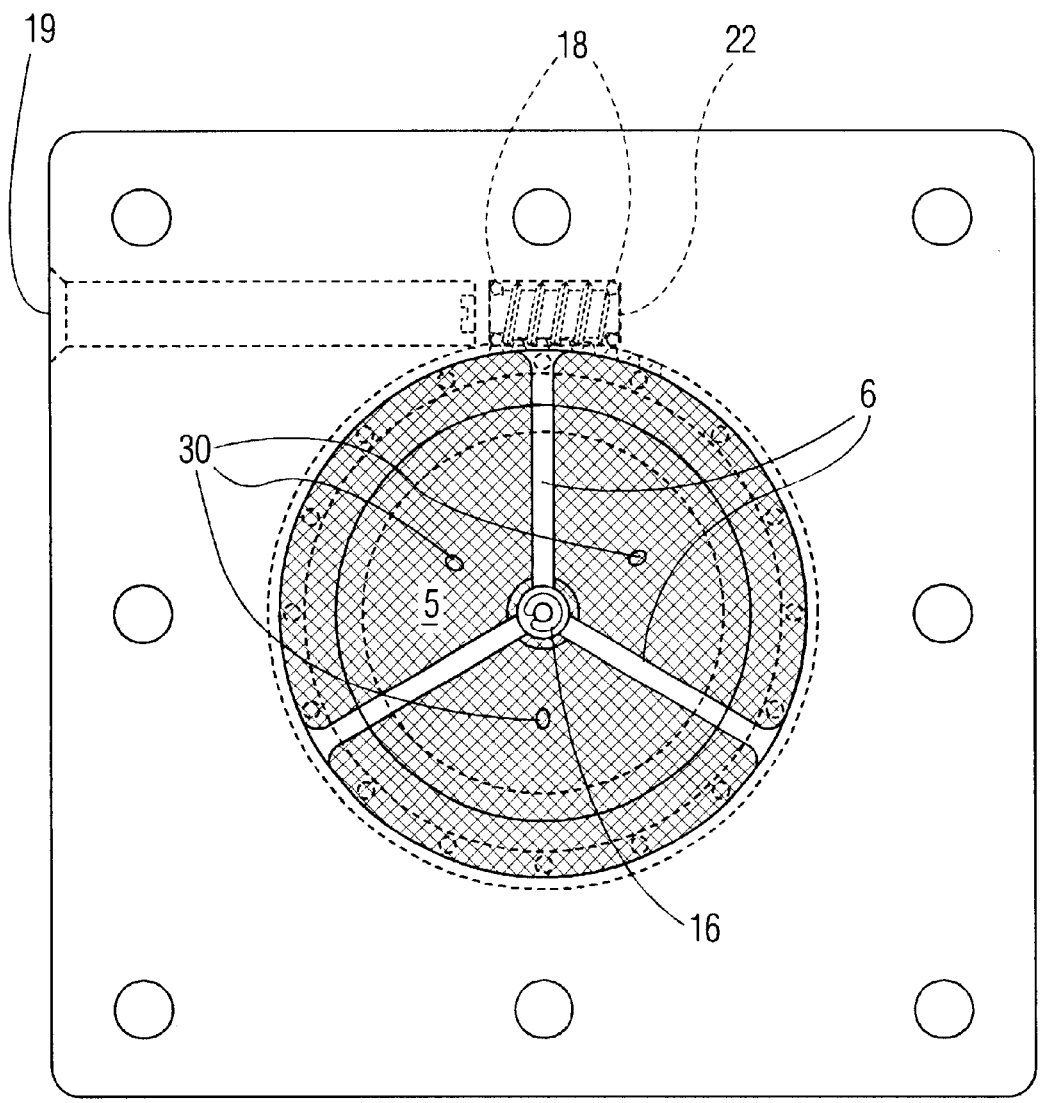
FIG. 3 is a front view of the diaphragm valve.
Figure 4:
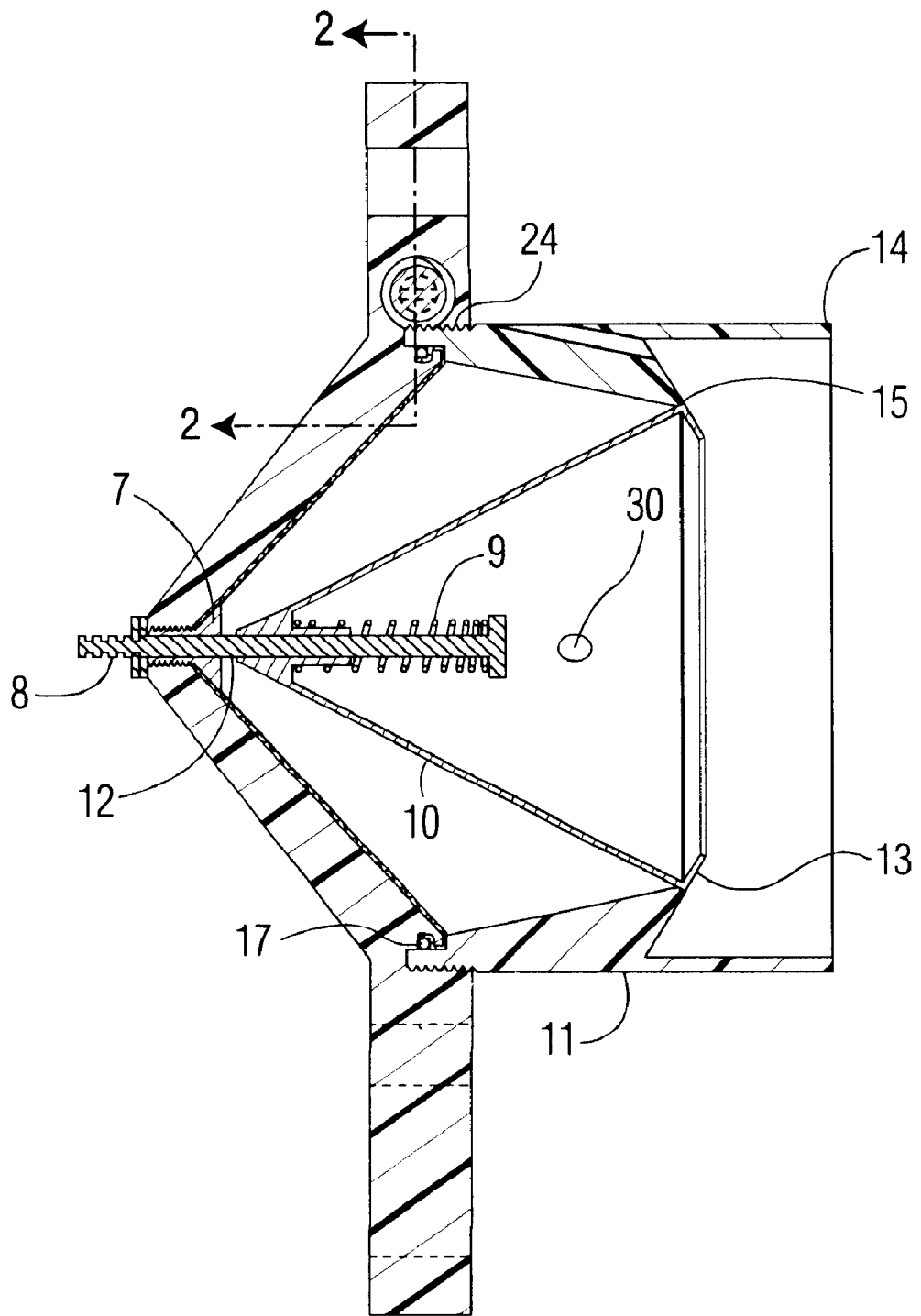
FIGS. 4 and 6 are right side sectional views of the diaphragm valve assembly in its sealed position.

FIG. 3 is a front view of the valve assembly showing the diffuser screen 5 that is held in place with a retaining screw 7, best shown in side view of FIG. 4. The retaining screw 7 is attached by its threaded portion at the apex of the valve guide shafts bracing 6. The outer edge of the diffuser screen 5 is held at the junction point of the mounting plate 1 and the valve body 11. Also shown in FIG. 3 is retaining clip 16 for guide shaft 12 and the worm gear 22 o-ring seals 18.

FIG. 4 is a right side view of the valve assembly in its closed position with its diaphragm 10 sealed against its valve seat 15. This view also best illustrates the relationship between the converging walls of the joined intake port of the mounting plate 1 and the valve body 11. The opposing walls of the valve's diaphragm 10 narrow thus forming a funnel like nozzle that is responsible for the increased velocity of the fuel/air charge. FIG. 4 also shows the threaded receiver 24 of the mounting plate 1 engaging the valve body's threaded portion. Also shown is the o-ring seal 17 that gives this junction a hermetic seal.

Figure 5:
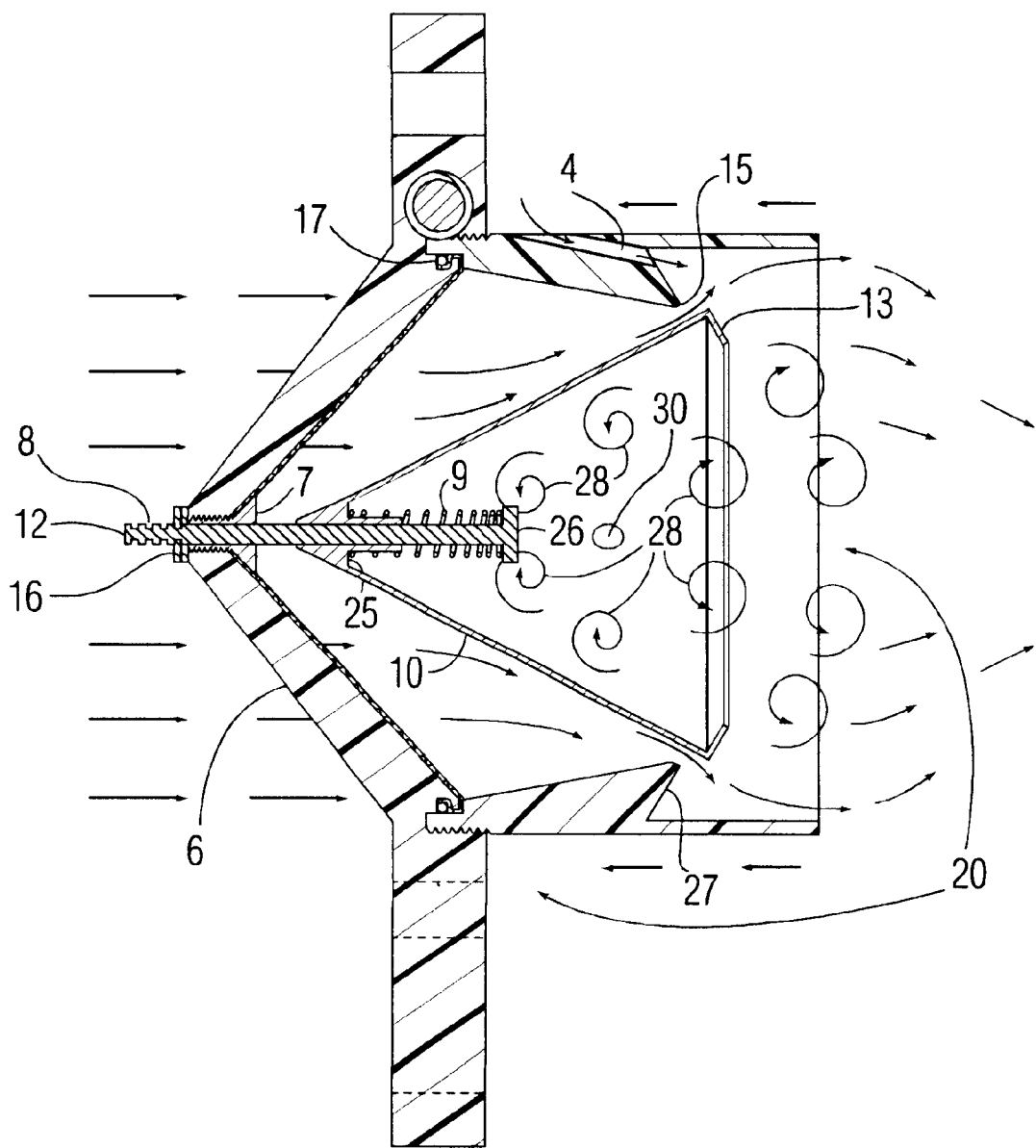
FIG. 5 is a right side sectional view of the diaphragm valve assembly in an open position.

FIG. 5 is a right side view of the valve assembly in an opened position with illustrated incoming fuel/air flow. The moveable element of the valve assembly includes a lightweight diaphragm 10, with its clearance fitted diaphragm alignment guide 29, mounted on its guide shaft 12. Shaft 12 is slip fitted through the diffuser screen retainer screw 7, exposing the valve's internal tension adjustment notches 8. The retaining clip 16 attaches the guide shaft allowing variable preload tension on the valve diaphragm 10. Held in position by the guide shaft 12, is the valve's diaphragm 10, which is tensioned against the valve body seat 15 by a compression spring 25 that is captured between the diaphragm's spring seat 25 and the guide shaft head 26. Near the aft end of the valve body 11 is a recess 27 with a plurality of vent holes 4, best shown in FIG. 1, formed about the periphery of the valve body providing a means to ventilate the plenum area 20 around the exterior of the valve body. The ventilators are positioned to siphon the unspent gases of the previous cycle back into the slipstream of the fresh incoming fuel/air charge. Also shown in FIG. 4, is the vectoring skirt 14 that cooperates with the diaphragm's vortex generator 13 to shape and direct the charge. Numeral 28 represents the low pressure vortex caused by the vortex generator 13 formed on the interior edge of the diaphragm 10. This vortex 28 is also responsible for atomization of the fuel/air charge.

Figure 6:
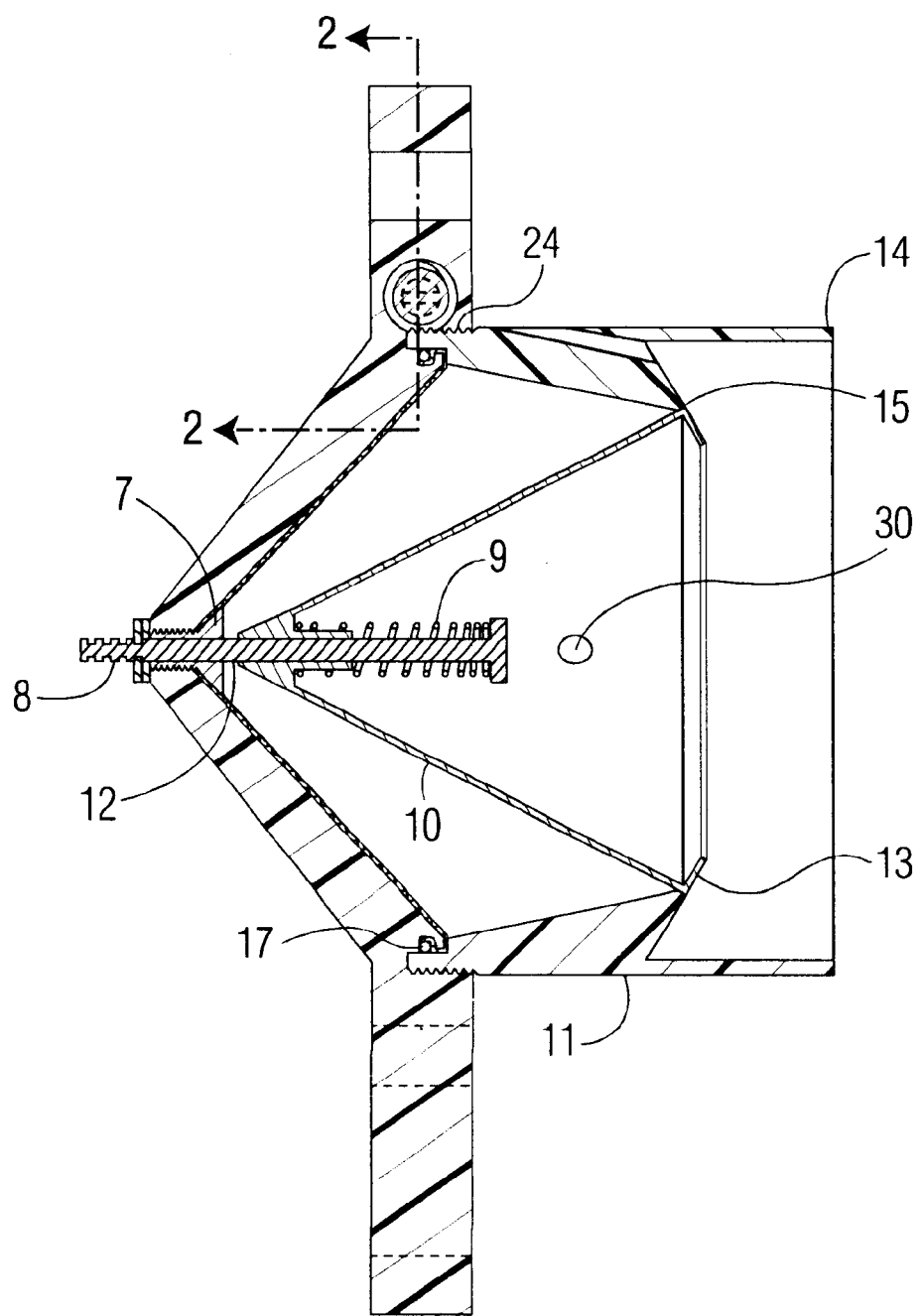

In operation, the valve diaphragm 10, FIGS. 4–6, is actuated by the alternating pressure caused by the engine's reciprocating piston. With an advancing piston, a vacuum is created in the plenum area. This vacuum causes the diaphragm to be drawn away from the valve seat 15, FIGS. 4–5 on the valve body 11. This permits the carbureted fuel/air to be pulled through the diffuser screen 5, FIG. 3, to initiate atomization of the fuel/air charge. The charge also passes through the funneled opening formed by the converging walls of the valve body 11, FIGS. 4–5, and the diaphragm 10. This process forms the atomized fuel/air charge into a dense, homogenized charge that will have gained velocity. This charge is then shaped and directed to the combustion chamber by the combination of a vector skirt 14, FIGS. 4–5, venting holes 4 shown in FIG. 1, and the vortex generator 13, shown in FIG. 4. The charge is then further atomized by the circulation caused by the siphoning action of venturi 4 and the low pressure vortex 28, FIG. 5, caused by the concave shape of the diaphragm 10 with its attached vortex generator 13.

Conversely, with a retreating piston, the increased crankcase pressure developed causes the valve diaphragm 10 to be closed against its valve seat 15. This seating action will seal the plenum area thereby decreasing backflow through the carburetor, while promoting the scavenging of the previous cycles' fuel/air charge into the combustion chamber.

As shown in FIGS. 1 and 4, valve diaphragm 10 may have bleed off holes 30 formed therein at an angle of approximately 30° with respect to the vertical. These holes serve to aid in the circulation of the flow in the areas behind the valve diaphragm 10.

It should be understood that the shape of the diaphragm valve, and the size, location, and configuration of the valve structure as an assembly will be based on the function of the configuration of the connecting structure that best serves its intended applications performance as seen fit by those skilled in the art.

Having thus described the invention in detail, it is to be understood that the foregoing description is not intended to limit the spirit and scope thereof. What is desired to be protected by Letters Patent is set forth in the appended claims.

I claim:

1. A valve comprising:
    a valve body positioned across substantially all of the area of an intake manifold; and
    an adjustable spring loaded conically shaped valve diaphragm mounted in said valve body;
    said diaphragm seating along substantially its entire circumference against a portion of said valve body when said diaphragm is in its closed position and said diaphragm being unseated along substantially its entire circumference from said portion of said valve body when said diaphragm is in its open position.

2. The valve assembly of claim 1 further including adjusting means connected to said valve body for changing the position of said valve body in an intake manifold.

3. The valve assembly of claim 2 wherein said adjusting means includes a manually movable worm gear.

4. A valve assembly for an internal combustion engine comprising:

- a mounting plate having an aperture formed therein, a diffuser screen connected to said mounting plate across substantially the entire area of said aperture;
- a plurality of support braces connected to said mounting plate across said aperture, said support braces forming an intersection at the midpoint of said aperture;
- an adjustable spring loaded shaft connected to said braces at said intersection, a cylindrical valve body connected to said mounting place at the periphery of said aperture; and a conical valve diaphragm connected to said adjustable spring loaded shaft mounted within said cylindrical valve body;
- said conical valve diaphragm being movable within said cylindrical valve body between an open position and a closed position, said conical valve diaphragm sealing against a portion of said valve body for substantially the entire circumference of said valve body when said conical valve diaphragm is in said closed position;
- said conical valve diaphragm forming areas of turbulence across its inner and outer surfaces when in said open position.

5. A valve for an internal combustion engine comprising a valve body having an inlet and an outlet;

- a conical shaped valve diaphragm mounted within said valve body, said conical shaped valve diaphragm having its circular plane end in proximity to said outlet and its opposite end in proximity to said inlet, said conical shaped valve diaphragm causing turbulence to be generated in a fuel/air mixture passing over the outer surface of said conical shaped valve diaphragm at said inlet and additional turbulence to be generated within said conical shaped valve diaphragm and in proximity to said circular plane at said outlet, said turbulence causing a improved mixing of fuel and air passing to said internal combustion engine.

6. The valve of claim 5 wherein said valve body has an internal lip formed about substantially the entire interior circumference of said valve body for cooperating with a portion of said conical shaped valve diaphragm in proximity to said circular plane to close said valve.

7. The valve assembly of claim 5 further including diffuser means fluidly coupled to said inlet for mixing a fuel/air mixture.

8. The valve assembly of claim 5 further including vortex generator means attached to said conical shaped valve diaphragm in proximity to said circular plane for improving the mixing of a fuel/air mixture.

9. The valve assembly of claim 5 further including worm gear means attached to said valve body for adjusting the position of said valve body in an internal combustion engine.

10. The valve assembly of claim 9 wherein said worm gear means is manually movable.

11. The valve assembly of claim 5 further including adjustable tension spring loaded means for mounting said conical shaped valve diaphragm in said valve body.

12. The valve assembly of claim 11 further including mounting means attached to said valve assembly for mounting said valve assembly within the intake manifold of an internal combustion engine.

13. The valve assembly of claim 5 further in including aperture means formed in said valve body in proximity to said internal lip for conveying a portion of a fuel air mixture to said outlet.

14. The valve assembly of claim 5 further including aperture means formed in said conical shaped valve diaphragm for permitting a portion of a fuel air mixture to be conveyed there through.

15. The valve assembly of claim 9 wherein said worm gear means adjusts the lateral position of said conical shaped valve diaphragm within said valve body.

16. The valve assembly of claim 6 wherein said valve is closed by said conical shaped valve diaphragm contacting said lip over 360° of sealing.

* * * * *